United States Patent
Tseng et al.

(10) Patent No.: US 9,666,059 B2
(45) Date of Patent: May 30, 2017

(54) VEHICLE LIGHT ANOMALY STATE WARNING

(71) Applicant: Ford Global Technologies, LLC, Dearborn, MI (US)

(72) Inventors: Fling Tseng, Ann Arbor, MI (US); Aed M. Dudar, Canton, MI (US); Imad Hassan Makki, Dearborn Heights, MI (US); Robert Roy Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 14/242,035

(22) Filed: Apr. 1, 2014

(65) Prior Publication Data
US 2015/0279194 A1    Oct. 1, 2015

(51) Int. Cl.
| | | |
|---|---|---|
| G08G 1/09 | (2006.01) | |
| G08B 21/18 | (2006.01) | |
| B60Q 1/14 | (2006.01) | |
| G08G 1/0967 | (2006.01) | |

(52) U.S. Cl.
CPC ......... *G08B 21/185* (2013.01); *B60Q 1/1423* (2013.01); *G08B 21/182* (2013.01); *G08G 1/096725* (2013.01); *G08G 1/096741* (2013.01); *G08G 1/096775* (2013.01); *G08G 1/096791* (2013.01); *B60Q 2300/314* (2013.01); *B60Q 2300/47* (2013.01)

(58) Field of Classification Search
CPC .............. B60Q 1/143; B60Q 2300/305; B60Q 2300/312; B60Q 2300/314; B60Q 2300/33; B60Q 2300/3321; B60Q 3/0293; G08G 1/096775

USPC .......................................................... 340/468
See application file for complete search history.

(56) References Cited

U.S. PATENT DOCUMENTS

| | | | | |
|---|---|---|---|---|
| 5,247,440 | A * | 9/1993 | Capurka | B60Q 1/143 701/49 |
| 6,295,109 | B1 * | 9/2001 | Kubo | G02F 1/133371 349/117 |
| 7,949,190 | B2 * | 5/2011 | Wu | G06K 9/00825 382/103 |
| 2001/0025349 | A1 * | 9/2001 | Sharood | G06Q 30/0235 713/340 |
| 2006/0152935 | A1 * | 7/2006 | Petkov | B60Q 1/1423 362/459 |
| 2007/0142988 | A1 * | 6/2007 | Ziehr | B60Q 1/143 701/49 |
| 2007/0220907 | A1 * | 9/2007 | Ehlers | F25B 49/005 62/126 |
| 2007/0272831 | A1 * | 11/2007 | Dailey | H05B 37/0218 250/214 AL |

(Continued)

FOREIGN PATENT DOCUMENTS

| | | |
|---|---|---|
| JP | 2013035462 | 2/2013 |
| KR | 1020130055836 A | 5/2013 |

*Primary Examiner* — Fekadeselassie Girma
(74) *Attorney, Agent, or Firm* — Frank MacKenzie; Bejin Bieneman PLC

(57) ABSTRACT

A vehicle system includes a communication interface in communication with a processing device. The communication interface is configured to receive ambient light information from a remote server over a communication network. The processing device is configured to selectively enable a vehicle lighting system in accordance with the ambient light information.

18 Claims, 2 Drawing Sheets

(56) References Cited

U.S. PATENT DOCUMENTS

| | | | |
|---|---|---|---|
| 2009/0189779 A1* | 7/2009 | Gao | G08C 17/00 340/901 |
| 2010/0030419 A1* | 2/2010 | Tauchi | B60Q 1/1423 701/31.4 |
| 2010/0150428 A1* | 6/2010 | Andreev | G01N 21/66 382/145 |
| 2010/0213847 A1* | 8/2010 | Biondo | B60Q 1/085 315/82 |
| 2013/0002872 A1* | 1/2013 | Fantone | H04N 5/33 348/148 |
| 2013/0181612 A1* | 7/2013 | Ohno | H05B 37/02 315/151 |
| 2013/0182111 A1* | 7/2013 | Ogasawara | H04N 7/18 348/148 |
| 2013/0212659 A1* | 8/2013 | Maher | H04L 63/06 726/6 |
| 2014/0001961 A1* | 1/2014 | Anderson | H05B 37/034 315/153 |
| 2014/0052335 A1* | 2/2014 | Moon, Jr. | E01H 5/06 701/36 |
| 2014/0079217 A1* | 3/2014 | Bai | H04L 63/0869 380/270 |
| 2014/0270172 A1* | 9/2014 | Peirce | H04L 9/0819 380/270 |
| 2015/0145411 A1* | 5/2015 | Bae | B60Q 1/143 315/82 |
| 2015/0173156 A1* | 6/2015 | Pedersen | H05B 37/0272 315/151 |
| 2015/0189724 A1* | 7/2015 | Karc | H05B 37/0218 315/149 |
| 2015/0353058 A1* | 12/2015 | Ernst | B60S 1/0862 134/18 |
| 2016/0023588 A1* | 1/2016 | Peterson | B60Q 1/0094 315/77 |

\* cited by examiner

VEHICLE LIGHT ANOMALY STATE WARNING

BACKGROUND

Some vehicles are equipped to automatically turn on the headlights in low light conditions as determined by an on-board vehicle sensor. If this sensor malfunctions, the headlights will not automatically turn on. Public lighting and lighting from other vehicles, especially in urban areas, can sometimes make it difficult for a driver to realize that he or she is driving at night with the headlights of his or her vehicle turned off. Thus, the driver may not realize that the sensor has malfunctioned and that the headlights did not automatically turn on.

DETAILED DESCRIPTION

An exemplary vehicle system includes a communication interface in communication with a processing device. The communication interface is configured to receive ambient light information from a remote server over a communication network. The processing device is configured to selectively enable a vehicle lighting system in accordance with the ambient light information. The vehicle system, therefore, is able to detect low light conditions and enable the vehicle light system, if necessary, if the ambient light sensor has malfunctioned or is omitted from the vehicle.

The system shown in the FIGS. may take many different forms and include multiple and/or alternate components and facilities. The exemplary components illustrated are not intended to be limiting. Indeed, additional or alternative components and/or implementations may be used.

Figure 1:
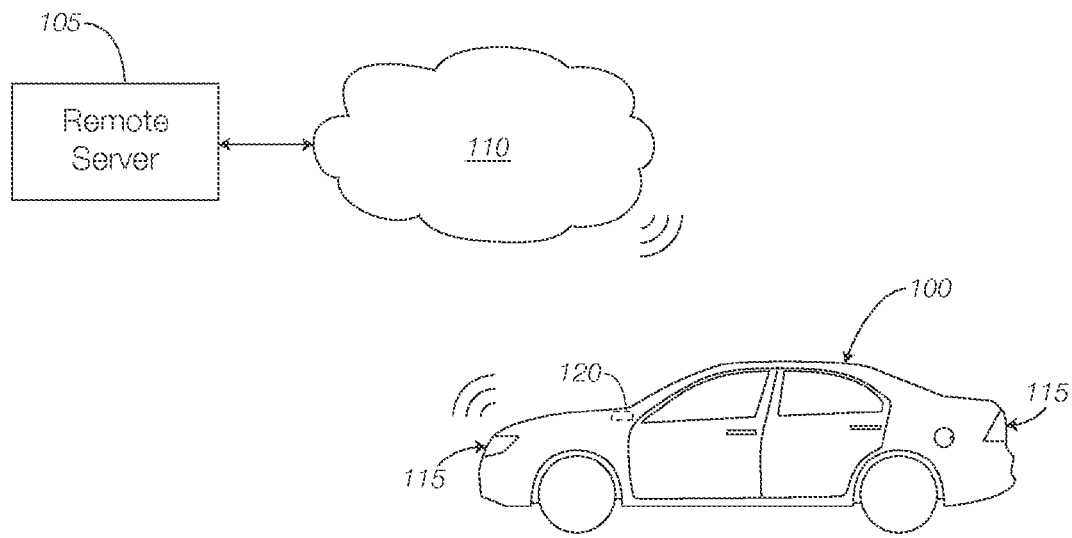
FIG. 1 illustrates an exemplary vehicle for detecting an anomaly state in a lighting system.

FIG. 1 illustrates a vehicle 100 in communication with a remote server 105 over a communication network 110. The vehicle 100 includes a lighting system 115 that may include external lights such as headlights, fog lamps, and tail lights. The lighting system 115 may be enabled by one or more components of the vehicle 100, as discussed in greater detail below with regard to FIG. 2. The vehicle 100 may further include an ambient light sensor 120 configured to detect and output signals representing the amount of ambient light near the vehicle 100. The vehicle 100 may be configured to operate the lighting system 115 despite anomalous readings or a malfunction of the ambient light sensor 120. Although illustrated as a sedan, the vehicle 100 may include any passenger or commercial vehicle such as a car, a truck, a sport utility vehicle, a taxi, a bus, etc. In some possible approaches, as discussed below, the vehicle 100 is an autonomous vehicle configured to operate in an autonomous (e.g., driverless) mode, a partially autonomous mode, and/or a non-autonomous mode.

The remote server 105 may be configured to store and/or transmit information pertaining to the vehicle 100. Examples of such information may include software, software updates, and/or firmware associated with one or more components of the vehicle 100 including the engine controller, the body controller, the transmission controller, the autonomous mode controller, the navigation system, the entertainment system, the climate control system, or the like. Alternatively or in addition, the remote server 105 may be configured to transmit ambient light information to the vehicle 100. Ambient light information may include information such as the current date, the current time of day, the time of sunrise, the time of sunset, the amount of time since the previous sunrise, the amount of time until the next sunset, or the like. In some possible approaches, the ambient light information may include weather information such as a weather forecast, a current weather condition (e.g., sunny, raining, cloudy, foggy, snowing, hailing, windy, etc.), and an amount of precipitation. The remote server 105 may be configured to transmit and/or receive data over a communication network 110 in accordance with any number of communication protocols. In some possible implementations, the remote server 105 may be configured to conduct data transfers in response to a query from the vehicle 100. In other possible approaches, the remote server 105 may be configured to conduct data transfers according to a schedule or without a request from the vehicle 100.

Figure 2:
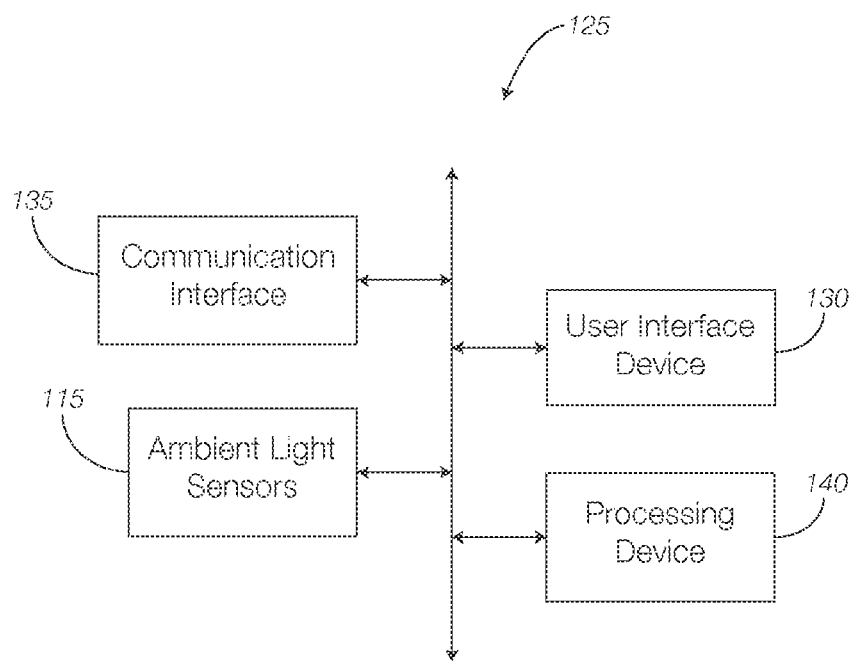
FIG. 2 is a block diagram of a system that may be used in the vehicle of FIG. 1.

FIG. 2 is a block diagram of an exemplary system 125 that may be incorporated into the vehicle 100 of FIG. 1. As illustrated, the system 125 includes a user interface device 130, a communication interface 135, and a processing device 140. Moreover, the ambient light sensor 120 and/or the lighting system 115, discussed above, may be in communication with any one or more of the components of the system 125.

The user interface device 130 may be configured to present information to a user, such as a driver, during operation of the vehicle 100. Moreover, the user interface device 130 may be configured to receive user inputs. Thus, the user interface device 130 may be located in the passenger compartment of the vehicle 100. In some possible approaches, the user interface device 130 may include a touch-sensitive display screen.

The communication interface 135 may be configured to facilitate wired and/or wireless communication between the components of the vehicle 100 and other devices, such as the remote server 105 or even another vehicle when using, e.g., a vehicle-to-vehicle communication protocol. The communication interface 135 may be configured to receive messages from, and transmit messages to, a cellular provider's tower and the Telematics Service Delivery Network (SDN) associated with the vehicle 100 that, in turn, establishes communication with a user's mobile device such as a cell phone, a tablet computer, a laptop computer, a fob, or any other electronic device configured for wireless communication via a secondary or the same cellular provider. Cellular communication to the telematics transceiver through the SDN may also be initiated from an internet connected device such as a PC, Laptop, Notebook, or WiFi connected phone. The communication interface 135 may also be configured to communicate directly from the vehicle 100 to the user's remote device or any other device using any number of communication protocols such as Bluetooth®, Bluetooth® Low Energy, or WiFi. An example of a vehicle-to-vehicle communication protocol may include, e.g., the dedicated short range communication (DSRC) protocol. Accordingly, the communication interface 135 may be configured to receive messages from and/or transmit messages to a remote server 105 and/or other vehicles. For example, the communication interface 135 may be configured to receive the ambient light information from the remote server 105 or from another vehicle.

The processing device 140 may be configured to process the ambient light information and selectively enable the vehicle lighting system 115 in accordance with the ambient light information received from the remote server 105 or via vehicle-to-vehicle communication. The ambient light information may be processed to, e.g., determine the amount of ambient light near the vehicle 100 and whether to enable the vehicle lighting system 115. This processing may be performed in addition to or instead of the readings taken by the ambient light sensors 120. Thus, even if the ambient light sensors 120 have malfunctioned or are omitted from the vehicle 100, the processing device 140 may turn on the vehicle 100 headlights when appropriate, such as at night or during weather conditions with limited visibility.

In some possible approaches, the processing device 140 may automatically enable the vehicle lighting system 115 based on the amount of ambient light determined from the ambient light information received from the remote server 105 or another vehicle. Alternatively, the processing device 140 may prompt the driver to manually select whether to enable the vehicle lighting system 115, thus serving as a warning to the user that the vehicle 100 is being operated without the headlights in low light conditions. To prompt the driver, the processing device 140 may be configured to output a signal causing the user interface device 130 to ask the user for a user input indicating the user's desire to enable the vehicle lighting system 115. Once the user input is received, the user interface device 130 may transmit the user input to the processing device 140 to selectively enable the vehicle lighting system 115 in accordance with the user input. Instead of prompting the user to manually enable the vehicle lighting system 115, the processing device 140 may use the user interface device 130 to present a message to the user that low light conditions have been detected and that the vehicle lighting systems 115 are going to be enabled.

As mentioned above, the vehicle 100 may receive ambient light information via the remote server 105 or vehicle-to-vehicle communication. In some possible approaches, the vehicle 100 may be configured to transmit ambient light information to other vehicles. For example, the processing device 140 may be configured to transmit signals representing the amount of ambient light as measured by the ambient light sensor 120 or determined from the ambient light information received from the remote server 105 to other vehicles via, e.g., the communication interface 135. In some instances, the processing device 140 may command the communication interface 135 to broadcast ambient light information. Alternatively, the processing device 140 may command the communication interface 135 to transmit the ambient light information at particular times or to particular vehicles. For example, the ambient light sensor 120 may be configured to determine whether another vehicle's headlights are turned on during low light conditions. If the headlights are turned off, the processing device 140 may command the communication interface 135 to broadcast the ambient light information, transmit the ambient light information directly to the other vehicle, or possibly command the other vehicle's lighting system 115 to turn on. The vehicle 100 may be further configured to receive such communications from other vehicles.

Figure 3:
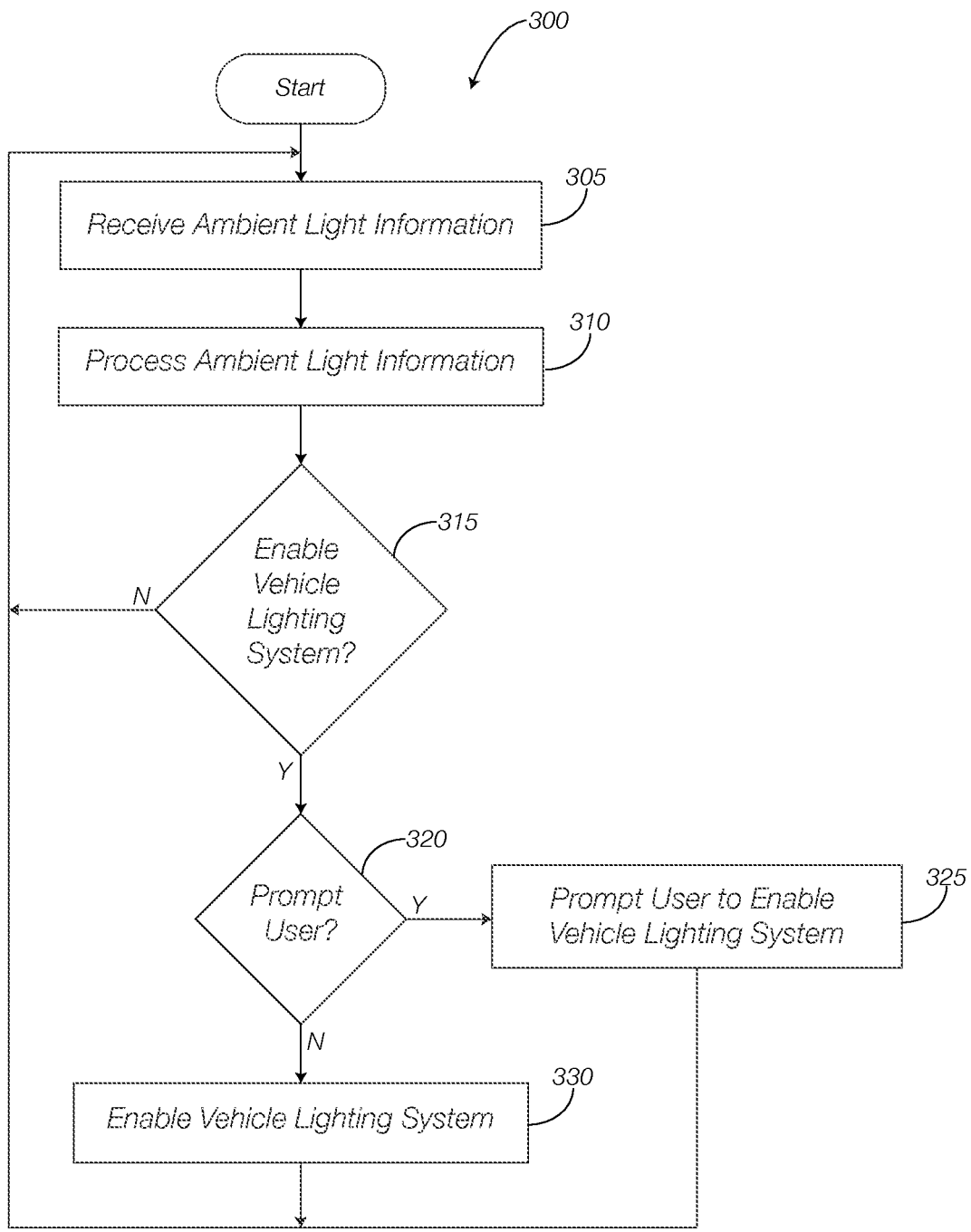
FIG. 3 is a flowchart of an exemplary process that may be used to detect an anomaly state in a vehicle lighting system.

FIG. 3 is a flowchart of an exemplary process 300 that may be implemented by the vehicle 100 to, e.g., detect low light conditions despite an inoperative ambient light sensor 120. The process 300 may be executed by any number of components such as the processing device 140.

At block 305, the processing device 140 may receive the ambient light information from, e.g., the communication interface 135. The ambient light information, as discussed above, may be received from a remote server 105 via the communication network 110. Alternatively or in addition, the ambient light information may be received via a vehicle-to-vehicle communication protocol.

At block 310, the processing device 140 may process the ambient light information to, e.g., determine the amount of ambient light near the vehicle 100. Processing the ambient light information may include determining the date, the time of day, the time of sunrise and/or sunset, the amount of time since the last sunrise, the amount of time until the next sunset, etc. Processing the ambient light information may also or alternatively identify weather information such as the weather forecast, the current weather conditions, and the amount of precipitation.

At decision block 315, the processing device 140 may determine whether to enable the vehicle lighting system 115 based on, e.g., the ambient light information. If so, the process 300 may continue at block 320. If not, the process 300 may return to block 305.

At decision block 320, the processing device 140 may determine whether to prompt the user to enable the vehicle lighting system 115. This determination may be made in accordance with a customizable setting. If the user is to be prompted, the process 300 may continue at block 325. If not, the process 300 may continue at block 330.

At block 325, the processing device 140 may prompt the user to manually enable the vehicle lighting system 115. The prompt may be presented to the user via the user interface device 130, and the vehicle lighting system 115 may be manually enabled following a user input provided to the user interface device 130 or, in some instances, by the user manually pressing a button, turning a knob, toggling a switch, etc., that controls power to the vehicle lighting system 115.

At block 330, the processing device 140 may enable the vehicle lighting system 115 in accordance with the ambient light information, and in some instances, in accordance with the customizable setting allowing the processing device 140 to control the vehicle lighting system 115 without user input. Enabling the vehicle lighting system 115 may include outputting a command signal commanding the vehicle lighting system 115 to turn on. After block 330, the process 300 may end until the next key-on cycle or until the vehicle lighting system 115 is turned off either by the user or in response to lighting conditions that no longer require that the vehicle lighting system 115 be turned on. Alternatively, as shown in FIG. 3, the process 300 may continue at block 305 after block 330.

In general, computing systems and/or devices, such as the user interface device 130 and the processing device 140, may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a communication interface configured to receive ambient light information from a remote server over a communication network, the ambient light information indicating an amount of ambient light outside a vehicle;
a processing device configured to detect an ambient light sensor malfunction from the ambient light information received from the remote server and selectively enable an external vehicle lighting system in accordance with the ambient light information despite the ambient light sensor malfunction,
wherein the processing device is programmed to detect that another vehicle's headlights are off during low light conditions and command the communication interface to transmit ambient light information to the other vehicle via a vehicle-to-vehicle communication protocol.

2. The vehicle system of claim 1, wherein the processing device is configured to process the ambient light information to determine the amount of ambient light near the vehicle.

3. The vehicle system of claim 1, wherein the ambient light information includes at least one of a date, a time of day, a sunrise time, a sunset time, an amount of time after sunrise, and an amount of time before sunset.

4. The vehicle system of claim 1, wherein the ambient light information includes weather information.

5. The vehicle system of claim 4, wherein the weather information includes at least one of a weather forecast, a current weather condition, and an amount of precipitation.

6. The vehicle system of claim 1, wherein the processing device is configured to process the ambient light information to determine whether to enable the external vehicle lighting system.

7. The vehicle system of claim 1, further comprising a user interface device, wherein the processing device is configured to prompt the user to manually enable the vehicle external lighting system based on the ambient light information.

8. The vehicle system of claim 7, wherein the processing device is configured to selectively enable the vehicle external lighting system in accordance with a user input provided to the user input device.

9. The vehicle system of claim 1, wherein the communication interface is configured to receive ambient light information via a vehicle-to-vehicle communication protocol.

10. A vehicle comprising:
an external lighting system;
at least one ambient light sensor programmed to measure an amount of ambient light outside the vehicle;
a communication interface configured to receive ambient light information from a remote server over a communication network, the ambient light information indicating the amount of ambient light outside a vehicle;
a processing device configured to detect that the ambient light sensor has malfunctioned from the ambient light information received from the remote server and selectively enable the external lighting system in accordance with the ambient light information despite detecting that the ambient light sensor has malfunctioned,
wherein the processing device is programmed to detect that another vehicle's headlights are off during low light conditions and command the communication interface is configured to transmit ambient light information via a vehicle-to-vehicle communication protocol.

11. The vehicle of claim 10, wherein the processing device is configured to process the ambient light information to determine the amount of ambient light near the vehicle.

12. The vehicle of claim 10, wherein the ambient light information includes at least one of a date, a time of day, a sunrise time, a sunset time, an amount of time after sunrise, and an amount of time before sunset.

13. The vehicle of claim 10, wherein the ambient light information includes weather information.

14. The vehicle of claim 13, wherein the weather information includes at least one of a weather forecast, a current weather condition, and an amount of precipitation.

15. The vehicle of claim 10, wherein the processing device is configured to process the ambient light information to determine whether to enable the external lighting system.

16. The vehicle of claim 1, further comprising a user interface device, wherein the processing device is configured to prompt the user to manually enable the external lighting system based on the ambient light information.

17. The vehicle of claim 16, wherein the processing device is configured to selectively enable the external lighting system in accordance with a user input provided to the user input device.

18. The vehicle of claim 10, wherein the communication interface is configured to receive ambient light information via a vehicle-to-vehicle communication protocol.

* * * * *